April 19, 1966
C. E. ADAMS ETAL
3,246,669
FLOW CONTROL STRUCTURE FOR USE WITH PILOT OPERATED
PRESSURE REDUCING VALVE
Filed Feb. 21, 1964
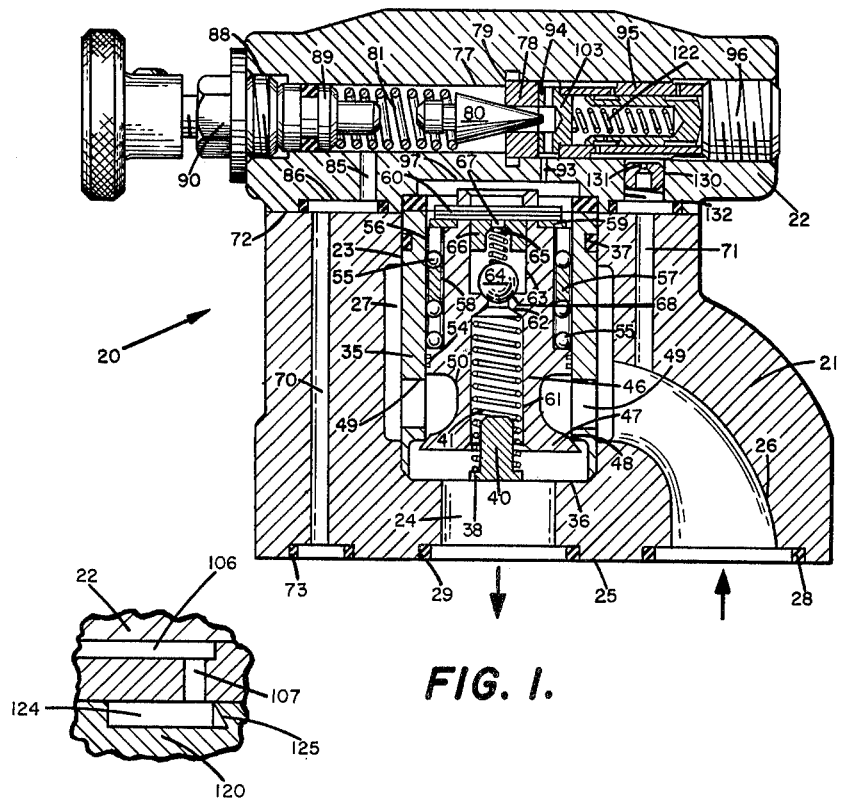
FIG. 1.
FIG. 3.
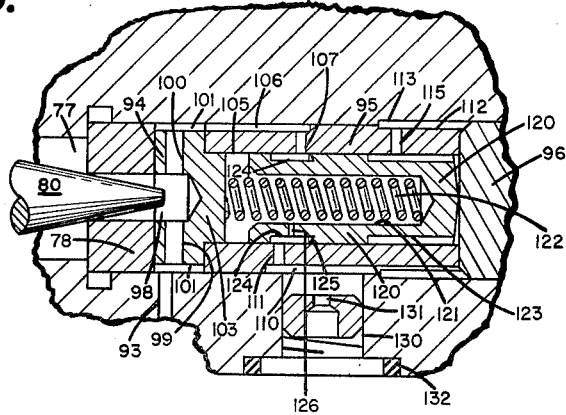
FIG. 2.
INVENTORS.
CECIL E. ADAMS
LEO H. DILLON
BY
WOOD, HERRON & EVANS United States Patent Office 3,246,669
Patented Apr. 19, 1966

3,246,669
FLOW CONTROL STRUCTURE FOR USE WITH PILOT OPERATED PRESSURE REDUCING VALVE
Cecil E. Adams and Leo H. Dillon, Columbus, Ohio, assignors to American Brake Shoe Company, New York, N.Y., a corporation of Delaware
Filed Feb. 21, 1964, Ser. No. 346,579
7 Claims. (Cl. 137—501)

This invention relates to pressure reducing valves. More specifically, the invention is directed to improvements in pressure reducing valves of the general type disclosed in Cecil E. Adams and Ellis H. Born Patent No. 2,747,606, issued May 29, 1956, for "Pressure Reduction Valve."

Pressure reducing valves are used between portions or sections of hydraulic systems or circuits wherein one portion of the circuit is supplied with fluid from another portion of the circuit, the pressure reducing valve functioning to reduce the pressure in that portion of the circuit being supplied and to maintain the pressure in the latter substantially constant so long as the pressure in the other or supply portion of the circuit remains above the setting of the pressure reducing valve.

A principal objective of the invention has been to provide improved flow control structure for use with pressure reducing valves of the pilot operated type, for example of the type shown in the above identified Adams patent, which will render the main valve more effective in operation at relatively low inlet pressures, for example, at pressures as low as 100 p.s.i., and which will establish more uniform operation of the main valve in response to a wide range of pressures, for example, from 100 to 5000 p.s.i.

In carrying out the principal object, it has been a further object to provide flow control structure wherein flow from the inlet to the outlet through the structure exerts no axial thrust on the movable flow control member.

It has been a further object of the invention to provide flow control apparatus for incorporation in a pressure reducing valve wherein the movable flow control valve member is stabilized to prevent excessive movement in response to minor or transient pressure fluctuations in the primary portion of the circuit to which the pressure reducing valve is connected, and in which the main path of flow through the flow control valve is isolated from the stabilizing means. Another object of the invention has been to provide improved flow control apparatus whereby flow through the pilot valve will be maintained more nearly constant regardless of pressure variations in the primary circuit in which the main valve is connected.

It has been a further object to provide flow control apparatus of the type described in which an improved filter is provided for preventing entrained dirt particles from clogging or impairing operation of the device.

Briefly, in accordance with a preferred embodiment of this invention, communication between the primary circuit and secondary circuit is governed by a main valve, preferably of the piston type, which is spring loaded toward closed position and which is subjected to differential fluid pressures at its opposite ends. One end of the main valve element is subjected to the pressure in the secondary circuit, while the pressure at the opposite end of the main valve member, which pressure tends to open the valve, is controlled by a pressure control pilot or relief valve which is actuated by fluid from the primary circuit. The pilot or relief valve communicates with the primary circuit through a flow control valve mechanism which meters flow through the relief valve when the latter is open.

The flow control valve mechanism includes a flow control piston which is movable in a chamber. Passage means including a restricted orifice communicate between one end of the piston in the chamber and the primary circuit. The flow control valve is defined between an orifice entering the chamber and a groove formed in the flow control piston. Fluid is supplied into the groove from the primary circuit through a restrictor, flows in the groove to the flow control orifice, and is applied from the orifice to the relief valve. Passage means including a restrictor communicate between the groove and the other end of the piston in the flow control chamber. The restricted orifices leading to the opposite ends of the piston in the chamber throttle flow into or out of the chamber and thereby provide dash-potting effects which stabilize movement of the piston in response to pressure fluctuations.

The objects and advantages of the invention will be further apparent from the following description, reference being had to the accompanying drawing wherein a preferred structure incorporating the principles of the invention is shown.

In the drawing;

FIGURE 1 is a vertical longitudinal section of a valve formed in accordance with the invention, FIGURE 2 is a fragmentary section, on an enlarged scale, of a portion of the valve shown in FIGURE 1, the plane of this figure being the same as that of FIGURE 1, and FIGURE 3 is a fragmentary section of FIG. 2 on a still larger scale, the view showing structural details of a valve more clearly.

Referring to the drawings, the numeral 20 designates the valve generally. The valve includes a body 21, which may be cast, and a cap section 22 which may be formed in similar manner. The cap 22 is secured to the body by mounting screws not shown. The body 21 is provided with a central vertical opening or bore 23 which enters the body 21 from the upper end and which communicates at its lower end with an extension or outlet bore 24. The outlet bore 24 extends to the lower face 25 of the body 21. A curved inlet port or passage 26 communicates between the lower face 25 of the body and a circumferential groove 27 formed in bore 23 spaced above the lower end thereof. The lower ends of both outlet bore 24 and inlet port 26 are provided with O-rings 29 and 28 respectively, fitted in recesses, which form fluid seals when the body 21 is fitted for example to a conventional sub-plate at its bottom face 25.

Bore 23 receives a cylindrical receives a cylindrical liner or sleeve 35, the lower end of which is located in the body by an annular shoulder 36 formed where bore 23 meets smaller diameter outlet bore 24. An external circumferential groove in sleeve 35, above groove 27 of bore 23, is fitted with an O-ring 37 which forms a seal with the surface of bore 23. Between the liner or sleeve 35 and the shoulder 36 there is disposed a spring abutment bar or strap 38 having a central projection or hub 40 for locating the lower end of a coil spring 41. The bar or strap 38 rests at its opposite ends upon the shoulder 36 and spans the outlet bore 24.

Coil spring 41 urges a piston valve 46 which is slidable in liner 35 in an upward direction and urges a conically tapered head 47 thereon into engagement with a right angular seat 48 formed by an inner edge or shoulder presented by liner 35. The valve 47, 48 is the main valve of the structure.

In registration with the inlet port 26 the liner 35 is provided with openings or ports 49 whereby fluid introduced into port 26 can flow into the interior of the liner 35. The ports 49 are located above seat 48 and fluid entering the interior of the liner through ports 49 is confined in a space or groove 50 around the piston valve 46 above head 47 thereof while the head is in engagement with the seat 48.

Piston valve 46 has a piston section 54 which is slidable in liner 35. The piston section 54 is maintained in concentric relationship with liner 35 by providing the piston valve with a suspension type mounting similar to that disclosed in Cecil E. Adams Patent No. 2,777,465, issued January 15, 1957. This mounting includes a plurality of sets of ball bearings 55 which are mounted between a reduced portion 58 above the piston section 54 and the iner surface of the liner 35. The ball bearings 55 are disposed in slots 56 formed in an annular retainer 57 which is positioned between the inner wall of the liner and the reduced portion 58 of the piston valve. Under normal conditions the ball elements 55 are disposed at the lower ends of the slots 56, as viewed in FIGURE 1, when the head 47 of the piston valve is engaged with the seat 48. This arrangement permits the valve 46 to move away from the seat 48 with very low friction. In the normal operation of the valve the distance moved by the piston valve 46 as the valve opens is relatively small, and the slots 56 are long enough to permit additional movement. A washer 59 and kin 60 hold retainer 57 in place.

Piston valve 46 is provided with a central socket 61 to receive the spring 41, the upper end of the spring being engaged with the upper end 62 of socket 61. A smaller diameter opening leads from the upper end of socket 61 to an upper bore 63, and a ball element 64 is normally seated on the upper edge 68 of this small diameter opening, on which it is resiliently retained by a spring 65. The upper end of spring 65 bears against a shoulder in a plug 66 fitted in upper bore 63. An opening 67 is formed through this plug 66. Ball element 64 and edge 68 define a check valve permitting fluid to flow in an upward direction through piston valve 46 and preventing flow in the reverse (i.e., downward) direction.

The body 21 is provided with two additional vertical bores 70 and 71. Bore 70 extends between the upper surface or face 72 of the body and the lower face 25 thereof, and bore 71 extends between the upper face of the body and inlet port 26. An O-ring 73 is provided in a recess around the lower end of bore 70.

The cap section 22 constitutes a control section and is fitted atop the flat upper surface 72 of the body section 21. The cap section 22 includes a horizontal through bore 77 into which a seat insert 78 is pressed, this insert 78 being located by a shoulder 79 in bore 77. The seat insert 78 is engaged by a cone-shaped valve member 80, the latter being held yieldably in engagement with the seat by a coil spring 81. Seat 78 and valve member 80 coact to form a relief or pilot valve, as will be shown hereinafter.

The portion of bore 77 in the cap section 22 which is downstream of valve member 80 communicates with a fluid reservoir or tank, not shown, through an exhaust port 85 which intersects bore 77, a larger bore or recess 86, and bore 70 in the body section. An O-ring seal is provided between bores 70 and 86 to prevent leakage of fluid between the interface of the cap section and body.

The force of the spring 81 can be varied by an adjusting screw 88 which is threaded into the cap section 22 to effect longitudinal movement of a spring abutment member 89, which is sealed to bore 77 by a circumferential O-ring. The positions of adjustment of the screw 88 and abutment member 89 are maintained by a lock nut 90.

Bore 77 also communicates with bore 23 of body 21 through a passage 93 formed in the cap section. This passage is located ahead of the valve seat insert 78 and valve member 80. Passage 93 opens into a large diameter recess or chamber 97 which is aligned with bore 23 in the body 21. An O-ring around the periphery of chamber 97 urges sleeve 35 downwardly against bar or strap 38 in bore 23.

The elements in bore 77 ahead of valve 78, 80, constituting a control pressure section, are shown in enlarged view in FIGURE 2. A port block 94 is held in sealing abutment with the face of seat 78 by a sleeve 95 which bears against it. Sleeve 95 is prevented from axial movement in bore 77 by a plug 96 which is threaded into the end of bore 77. The port block 94 has a central recess 98 and radial passages 99, 100, which communicate at their inner ends with recess 98 and at their outer ends with an annular groove or chamber 101 around the port block. The port block 94 has a central hub section 103 which is sealingly fitted in the internal chamber or bore 105 of sleeve 95.

Sleeve 95 has a longitudinal slot or groove 106 formed on its exterior surface extending from the left end thereof. Slot 106 communicates with the internal through bore 105 of the sleeve through a radial port or orifice 107 at its right end. A longitudinally extending slot or groove 110 is formed on the external periphery of sleeve 95 extending from the right end thereof, diametrically opposite slot 106, and this slot 110 communicates with the bore 105 of the sleeve through a radial orifice 111. The right end of sleeve 95 is reduced in diameter as at 112. This reduced portion cooperates wth an internal circumferential groove 113 formed in bore 77 of the cap section 22 to form a fluid filtering passageway the operation of which will be described in detail hereinafter. The right end of sleeve 95 is in sealing abutment with plug 96. The reduced diameter portion 112 of sleeve 95 has a radial orifice or restrictor 115 which communicates with bore 105 of the sleeve.

A flow control piston 120 is slidable in bore 105 of sleeve 95. This flow control piston 120 has an axial control bore 121 which a compression spring 122 is disposed. Bore 121 does not extend through piston 120 but is closed at its end opposite from port block 94. The left end of spring 122 engages hub 103 of port block 94, and the right end of the spring resides against the end of bore 121 in the flow control piston. Spring 122 urges the flow control piston toward abutment wth the plug 96.

The flow control piston 120 has a reduced diameter portion 123 adjacent its right end, and has a circumferential groove 124 which is in constant communication with the orifice 111 of sleeve 95. The right edge 125 of groove 124 is angulated sharply inwardly, that is, is undercut, as best shown in FIGURE 3. The reason for the undercut angulation of edge 125 is to minimize axial thrust on the flow control piston resulting from flow across edge 125. The angulation of this edge may suitably be about 60°.

Restrictor orifices 126 provide communication between groove 124 and the bore 121 of the flow control piston 120.

Slot 110 of sleeve 95 is in fluid communication with a bore 130 in the cap section 22, and a plug having an orifice 131 formed through it is secured in bore 130. At its lower end, bore 130 communicates with bore 71 in body 21. An O-ring 132 is provided around the joint between the bores 130 and 71.

Suitable sizes for orifices 111, 115 and 126 are:

orifice 111—0.040″
orifice 115—0.035″
orifice 126—0.035″

It should be noted that the orifice or restrictor 131, which communicates with inlet port 26 through bore 71, functions as a stabilizing orifice. That is, the orifice 131 helps damp pulsations in the fluid pressure across it, and thereby tends to prevent such pulsations from appearing in the flow control section of the valve.

When the pressure reducing valve is connected in a hydraulic system, the inlet passage 26 communicates directly with the high pressure section of the system, that is, the section directly connected with the source of fluid under pressure. When operation of the system is initiated, fluid flows into passage 26, through groove 27 and ports 49 into the groove 50 around the piston valve 46 between the head 47 and the piston section 54 thereof. Since the head and piston section provide oppositely facing areas of equal dimensions the force of this fluid under pressure is balanced and the valve 47, 48 will tend to remain closed under the force of spring 41. Some of this fluid, however, will flow through bore 71, orifice 131, into slot 110 of sleeve 95, and through orifice 111 into groove 124 of the flow control piston 120. Fluid flows through groove 124 of flow control piston 120, and through slot 106 to groove 101 and radial bores 99 and 100 of the port block, to passage 93 into the space or chamber 97 above piston valve 46. The force of this fluid acting on the upper end of the piston valve urges the piston valve downwardly, tending to open the valve 47, 48. When the differential fluid force between the valve opening force of fluid above the piston valve and the force of fluid in passage 24 tending to close the valve, equals the force of spring 41, the piston valve will be moved downward to an open position permitting fluid flow from the passage 26 directly to the passage 24.

As the pressure in the system increases the increasing force applied to the right end of the cone-shaped valve member 80 tends to move this member away from its seat 78. When the force is sufficient to overcome spring 81 this valve member 80 moves off its seat 78 and connects the control pressure zone upstream of it with the outlet or drain passage 70. Fluid flowing through bore 71 into the control pressure zone is then permitted to flow to tank or exhaust and the pressure acting on the end of valve member 80 is maintained at the value determined by the setting of spring 81.

As fluid flows into slot 110 of sleeve 95 from bore 71, some of it will flow into the reduced diameter portion 112 of sleeve 95 and around that portion to the orifice 115. The space defined between groove 112 of sleeve 95 and groove 113 of bore 77 defines a fluid filtering passageway which is smaller in annular width than the diameter of orifice 115, and this filtering passageway thereby traps foreign particles that may be in the fluid and prevents them from blocking the restricting orifice 115. The annular area of this fluid filtering passageway is sufficient to permit fluid to flow around any foreign particles that may become trapped in it, while its annular width is sufficiently small to trap such particles.

Fluid under pressure flows through orifice 115 into the annular groove around reduced diameter portion 123 of the flow control piston 120 and acts against the right end of the flow control piston. The piston 120 tends to be moved toward the left by this pressure and in so doing tends to compress spring 122. At the same time, part of the fluid under pressure from bore 71 flows from groove 124 through orifices 126 into the bore 121 of the flow control piston, and tends to urge the piston to the right, thereby acting against the force of fluid on the right end of piston 120.

Valve 47, 48 remains open until the valve opening differential between the fluid forces acting on its opposite ends becomes less than the valve closing force of spring 41. Before the valve 78, 80 opens, there is a pressure drop across the valve 47, 48, depending on the force of the spring 41 and other resistance offered by the valve and seat. When the valve 78, 80 opens and the pressure in the control pressure zone ceases to increase, the force tending to close the valve 47, 48, provided by the fluid pressure in bore 24 and spring 41, may increase and exceed the force tending to open the valve 47, 48 established by fluid pressure in the control pressure zone. The valve 47, 48 will then close and prevent further increase in pressure in bore 24. It will be understood that the increase in pressure in bore 24 which is necessary to effect closing of the valve 47, 48, is slight and the valve therefore will close rapidly when the relief valve 78, 80 is opened to the proper extent.

The angulated or undercut edge 125 of groove 124 of the flow control piston and the inner end of orifice 107 of sleeve 95 coact to establish a flow control action for metering the volume of fluid flowing through the valve 78, 80 when that valve is open. That is, the edge 125 is positionally adjusted, relative to orifice 107, by pressure changes to increase or decrease the opening through which fluid must flow to enter orifice 107. For example, if in response to a pressure increase in the inlet 26 a greater quantity of fluid flows into slot 110 of the sleeve 95, then the greater flow through restricted orifice 111 establishes a larger pressure drop across that orifice, so that the pressure in slot 110 is increased relative to that in groove 124 of the flow control piston 120. The pressure in slot 110 is reflected or communicated through orifice 115 to the groove 123 around the right end of the flow control piston, and this pressure urges the piston to the left. The lesser pressure in groove 124 is reflected through orifice 126 into the interior or bore 121 of the piston 120 and tends to urge the piston to the right. The pressure in bore 121 is less than that in slot 110 when valve 78, 80 is open, by reason of the drop across orifice 111 from flow through that orifice, and under stable conditions at ports 26 and 24 the force of spring 122 added to the fluid force acting on the left end of piston 120 is sufficient to hold the flow control piston at an intermediate stationary position, so that the valve 107, 124 is partially open. Unless the piston 120 is actually moving, there is no flow through the orifices 115 and 126, so that no pressure drop occurs across them, and even when the piston 120 is moving in one direction or the other, the flow through these orifices 115 and 126 necessary to permit such movement is very small, and the pressure drop across the orifices is not large.

By reason of the drop across orifice 111, a pressure surge at the inlet 26 increases the pressure at the right end of the piston relative to that at its left end. The area subjected to pressure at the opposite ends of flow control piston 120 being equal, the then greater pressure at the right end of the flow control piston moves the piston to the left, thereby compressing spring 122 and partially closing orifice 107, thereby maintaining substantially constant flow through valve 78, 80.

From the foregoing it will be seen that this flow control valve maintains the quantity of fluid permitted to flow from bore 71, through valve 78, 80 to tank at the minimum required to hold the pressure in the control pressure zone at the value determined by the setting of the relief valve spring 81. In other words, this flow control system meters the flow of fluid so as to maintain a substantially constant volume of fluid flowing from the control pressure section to tank when the valve 78, 80 is open. Without this action, if the volume of fluid flowing past valve 78, 80 were to change then the relative position of valve member 80 with respect to its seat 78 would also change and the pressure drop across the valve would also change.

It will also be seen that orifice 126 establishes a dash-pot effect when the flow control piston 120 is moving to the left. To permit piston 120 to move to the left fluid must be displaced from bore 121, and the restricting orifice 126 limits the rate at which this displacement can occur, so that the flow control piston 120 cannot be moved excessively rapidly to cut off or choke flow through orifice 107, even in response to a high pressure surge at inlet 26. This stabilizes the flow control piston 120 against excessive movement and thereby minimizes chatter or fluctuations in the operation of the main valve.

Similarly, restricting orifice 115 restricts the rate at which fluid can be displaced from groove 123 as the flow control piston 120 moves to the right. Thus, in effect, the flow control piston 120 has a separate dash pot chamber for each end, which chambers cooperate with the orifices 115 and 126 to control the rate of travel of the flow control piston. It is to be noted that when either orifice 115 or 126 is restricting the exhaust fluid flow from its respective dash-pot chamber the other of the two orifices 115 or 126 serves to throttle or choke the incoming fluid which causes the flow control piston 120 to move, thus further stabilizing the flow control piston 120 from erratic operation or chatter. The main fluid flow path, through the flow control orifice 107, 124 is isolated from both dash pots. Actual comparative tests have demonstrated that the valve of this invention is more stable in operation in circuits that have pressure surges or pulsations.

In the event that the pressure in the secondary section of the hydraulic system to which the valve is connected, that is, the pressure at bore 24, should tend to increase above the pressure setting of valve 78, 80, fluid can flow through port 24 past the check valve 64, 68 into chamber 97 and can be exhausted through relief valve 78, 80. The check valve 64, 68 closes as soon as excessive pressure in bore 24 is released.

While the embodiment of the present invention as herein disclosed constitutes a preferred form, it is to be understood that other forms might be adopted, all coming within the scope of the claims which follow.

We claim:

1. Flow control means adapted for operation between the inlet port of a pressure controlling main valve and the inlet port of a pressure responsive pilot valve controlling the operation of the main valve; said flow control means comprising an inlet communicating in use with the inlet port of said main valve, means presenting a chamber, a piston movable in said chamber, an outlet passage opening into said chamber at the side thereof and constantly communicating in use with the inlet port of said pressure responsive valve, fluid conduit means provided by said piston cooperable with said outlet passage to form a flow control orifice, passage means external to said piston constantly providing open communication between said inlet and said fluid conduit means of said piston, a flow restricting passage constantly communicating between said inlet and one end of said chamber, flow restricting means isolated from said flow restricting passage constantly communicating between said fluid conduit means of said piston and the opposite end of said chamber, and spring means urging said piston toward said one end of said chamber.

2. Flow control means for operation between the inlet of a pressure controlling main valve and the inlet of a pilot valve controlling operation of said main valve, said flow control means comprising, means presenting a chamber, an axially movable member in said chamber, structure presented by said chamber and the periphery of said movable member defining an adjustable flow control orifice the area of which is varied as the axial position of said member in said chamber is changed, passage means including said adjustable orifice leading in use from the inlet of said main valve to the inlet of said pilot valve, pressure differential means responsive to a pressure increase at said inlet to move said member in an axial direction reducing the area of said orifice, resilient means constantly tending to open said adjustable orifice, separate dash pot means at each end of said member for slowing axial movement of said member in either direction in said chamber, means providing constant communication of said dash pot means with said inlet, and flow restrictors isolating said dash pot means from said passage means.

3. Flow control means adapted for use with a pressure controlling main valve and a pilot valve controlling operation of the main valve; said flow control means comprising, means presenting a cylindrical chamber, a movable flow control member in said chamber, an outlet in the side of said chamber, fluid conduit means entirely provided by a groove in the periphery of said member cooperable with said outlet to form a flow control orifice, an inlet, passage means including a flow restrictor for constantly supplying fluid into said conduit means in said member from said inlet, a restricted passage constantly communicating between said conduit means and one end of said chamber, yieldable means urging said member toward a second end of said chamber, and passage means including a flow restrictor providing constant communication between said inlet and said second end of said chamber.

4. Flow control means adapted for operation with a pressure controlling main valve and a pilot valve controlling the main valve; said flow control means comprising an inlet, means presenting a flow control chamber, a piston movable in said flow control chamber, said piston isolating the ends of said chamber from each other, passage means including a flow restrictor constantly communicating between said inlet and one end of said flow control chamber, a peripheral groove around said piston, one edge of said groove being angularly undercut, an outlet opening in the side of said flow control chamber and cooperable with said undercut edge of said groove to form a variable flow control orifice, passage means including a flow restrictor constantly supplying fluid into said groove from said inlet, and passage means including a flow restrictor constantly communicating between said groove and the other end of said flow control chamber.

5. Flow control means adapted for operation in a pilot controlled pressure reducing valve to regulate flow through said pilot when the latter is open; said flow control means comprising, means presenting a chamber, a piston movable in said flow control chamber, said piston isolating the ends of said chamber from each other, an inlet, passage means including a flow restrictor and an annular filtering section formed by and between said piston and said chamber and providing constant communication between said inlet and one end of said flow control chamber, a groove provided by one of said piston and chamber, a port cooperable with an edge of said groove to form a flow control orifice, an outlet leading from said flow control orifice, passage means including a flow restrictor for constantly supplying fluid into said groove from said inlet, restricted passage means communicating between said groove and the other end of said flow control chamber, and yieldable means urging said piston toward said one end of said chamber.

6. Flow control means adapted for use with a main valve and a pilot valve controlling operation of the main valve, said flow control means comprising, means presenting a flow control chamber, a flow control piston movable in said flow control chamber, an inlet, passage means communicating between said inlet and one end of said flow control chamber, said passage means including an annulus having a radial dimension sufficiently small to trip solid particles flowing therein and a flow restrictor between said annulus and said one end of said flow control chamber, a flow path provided on the periphery of said piston, a port cooperable with a perimeter of said flow path to form a flow control orifice, passage means including a flow restrictor leading from said inlet into said flow path, restricted passage means communicating between said flow path and the other end of said flow control chamber, yieldable means urging said piston toward said one end of said chamber, and an outlet passage leading from said flow control orifice.

7. Flow control means adapted for use with a pilot operated pressure controlling valve; said flow control means comprising, a sleeve, a piston axially movable in said sleeve, said piston having a groove, an inlet, a flow restricting port through said sleeve providing constant communication between said inlet and said groove, passage means separate from said port including a flow restrictor providing constant communication between said inlet and one end of said piston, a flow restricting passage providing constant fluid communication between said groove and the other end of said piston, said flow restricting passage being separate from said passage means, an outlet including an orifice in said sleeve cooperable with an edge of said groove to form a flow control orifice, and means tending to open said flow control orifice.

References Cited by the Examiner

UNITED STATES PATENTS

| | | | |
|---|---|---|---|
| 2,747,606 | 5/1956 | Adams et al. | 137—489.5 |
| 2,881,794 | 4/1959 | Baldwin et al. | 137—501 |
| 3,146,790 | 9/1964 | Breitsprecher | 137—491 |

MARTIN P. SCHWADRON, *Acting Primary Examiner.*